(12) United States Patent
Wright

(10) Patent No.: US 12,103,622 B2
(45) Date of Patent: Oct. 1, 2024

(54) SAFETY MECHANISM FOR VEHICLE SWITCH PANELS

(71) Applicant: Shawn Wright, Pea Ridge, AR (US)

(72) Inventor: Shawn Wright, Pea Ridge, AR (US)

( * ) Notice: Subject to any disclaimer, the term of this patent is extended or adjusted under 35 U.S.C. 154(b) by 205 days.

(21) Appl. No.: 17/992,843

(22) Filed: Nov. 22, 2022

(65) Prior Publication Data
US 2024/0166035 A1 May 23, 2024

(51) Int. Cl.
*B62D 65/14* (2006.01)
*B60R 99/00* (2009.01)

(52) U.S. Cl.
CPC ........ *B62D 65/14* (2013.01); *B60K 2360/682* (2024.01); *B60R 99/00* (2013.01)

(58) Field of Classification Search
CPC ........ B60R 99/00; B62D 65/00; B62D 65/02; B62D 65/06; B62D 65/14; B60K 2360/682
See application file for complete search history.

(56) References Cited

U.S. PATENT DOCUMENTS

| | | | | |
|---|---|---|---|---|
| 6,102,464 A | * | 8/2000 | Schneider | B62D 43/10 296/97.23 |
| 10,272,844 B1 | * | 4/2019 | H N | B60R 11/0241 |
| 2003/0052501 A1 | * | 3/2003 | Schmidt | B60K 35/10 296/37.13 |
| 2011/0080015 A1 | * | 4/2011 | Spiegel | A01K 1/035 296/1.07 |

* cited by examiner

*Primary Examiner* — Matthew P Travers
(74) *Attorney, Agent, or Firm* — Chris Tanner; BlueCollarIP.com

(57) ABSTRACT

A vehicle safety system and method, having an attachment mechanism, a hinge, either a bend or a plurality of spacers, and a cover. The system comprises a hook and loop section which connects to a vehicle door as well as a hook and loop section which connects to the attachment mechanism.

20 Claims, 19 Drawing Sheets

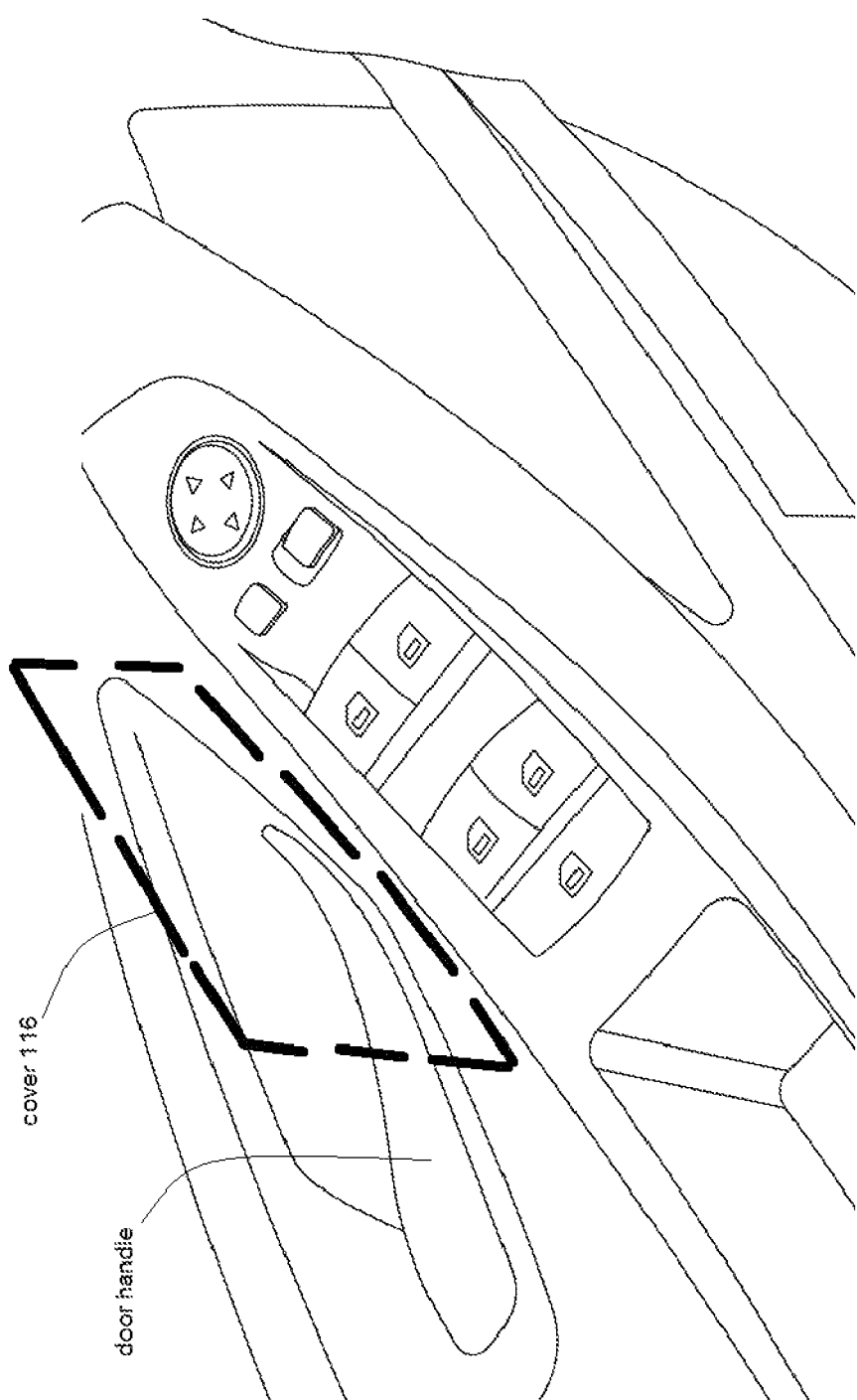
FIG. 5B (conflict)

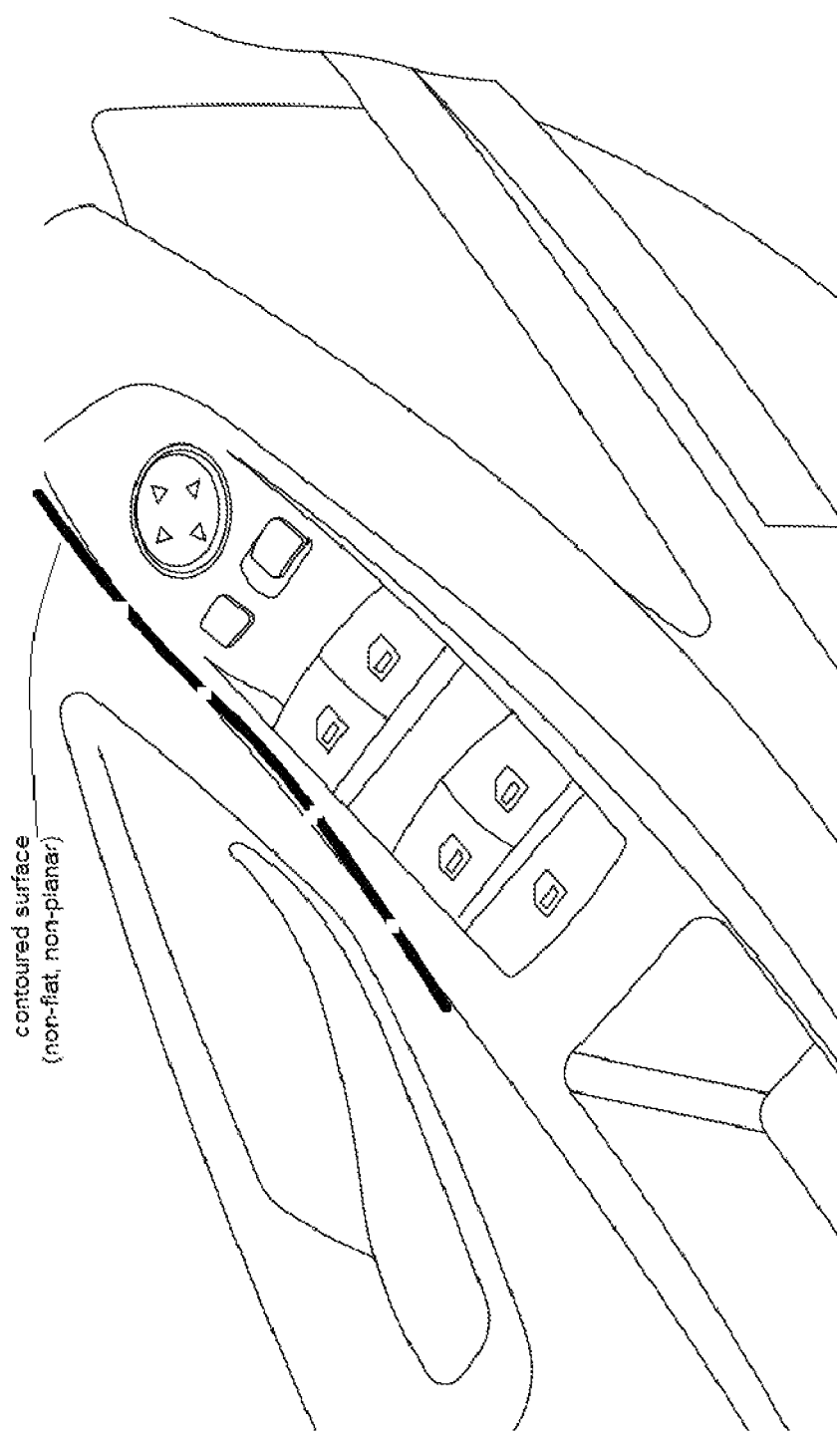
FIG. 5C (bends and contours)

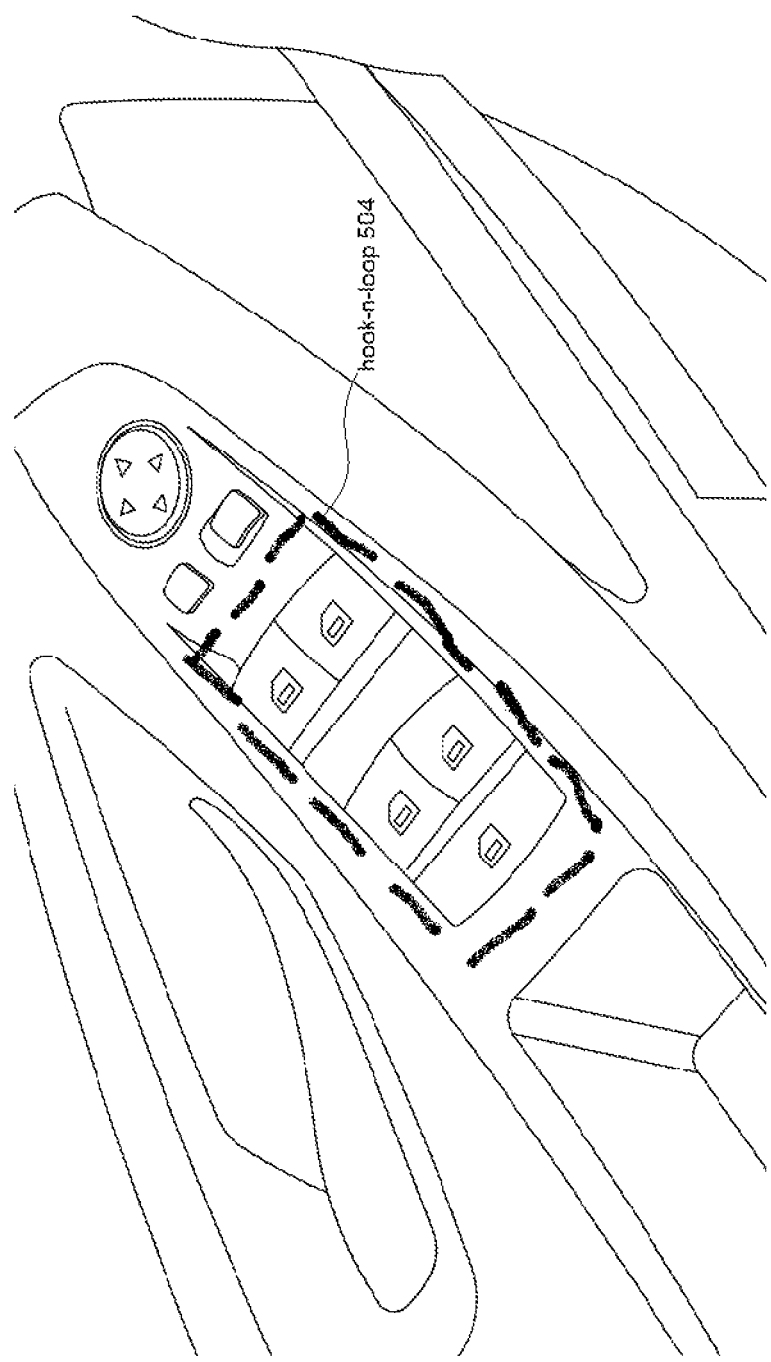
FIG. 5D (no hinge, hook-n-loop)

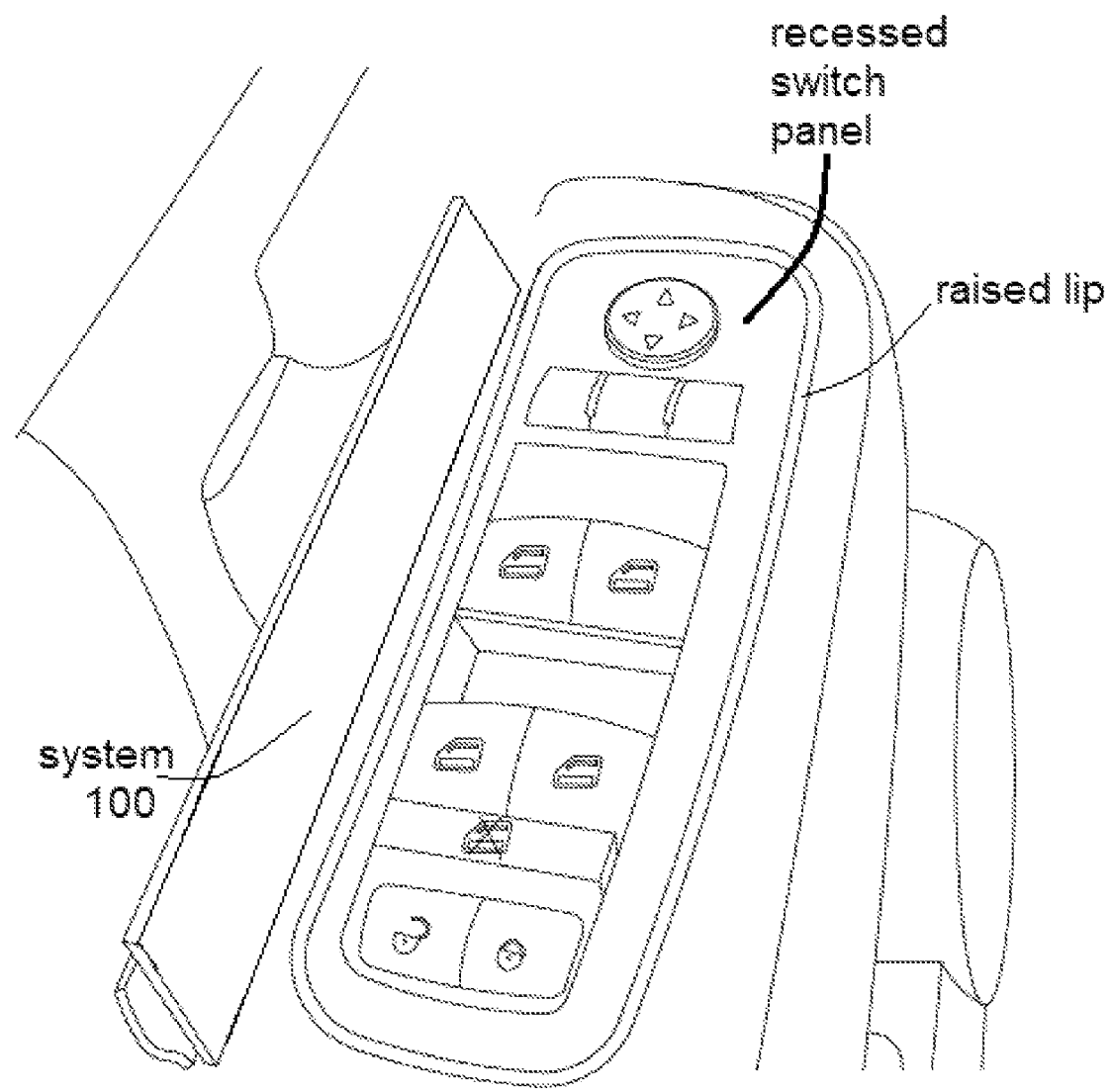
FIG. 7 (no bend 112)

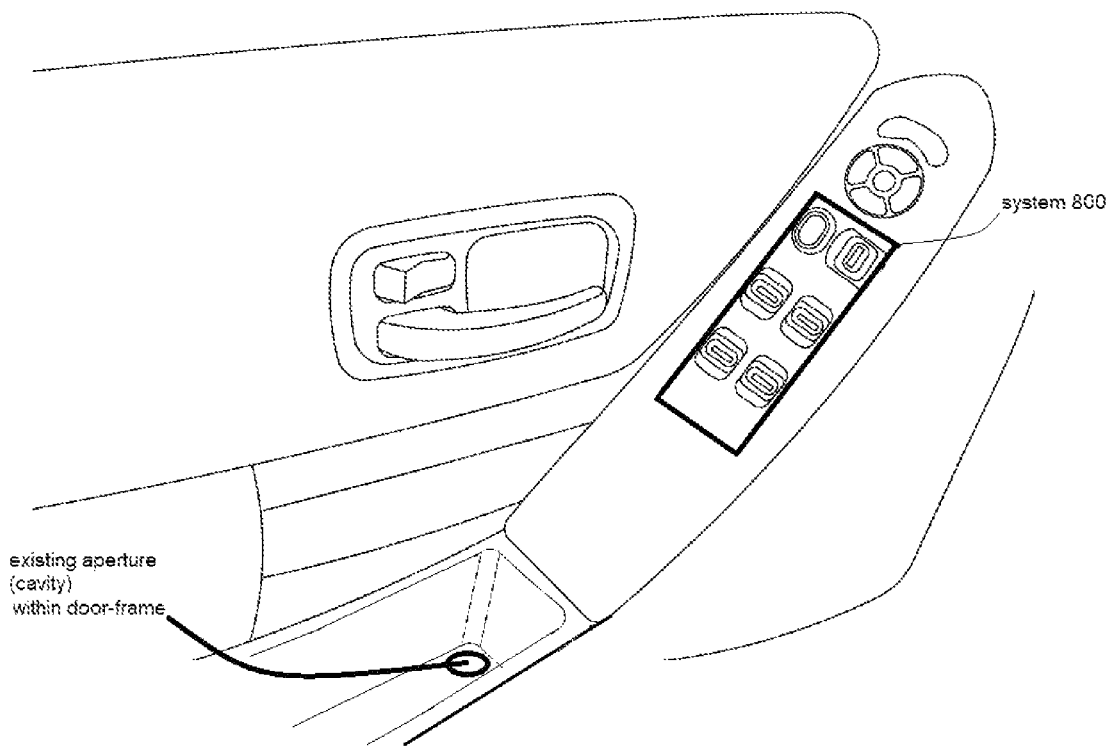
FIG. 8B (closed position)

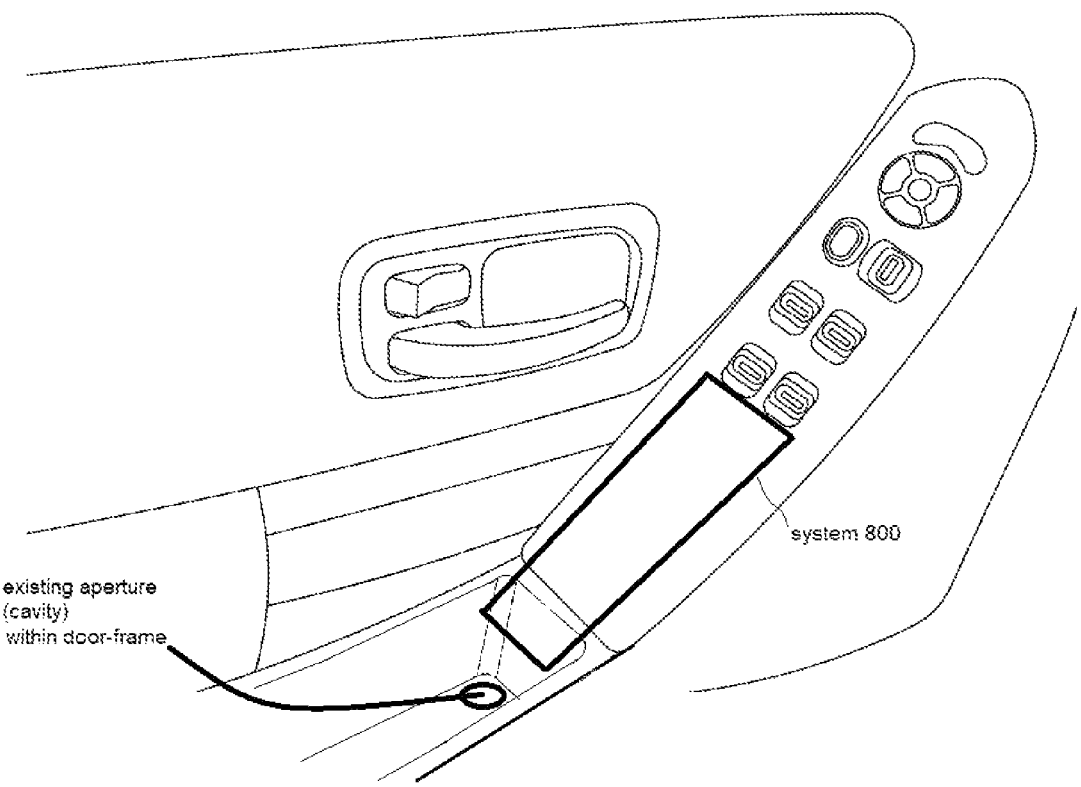
FIG. 8C (open position)

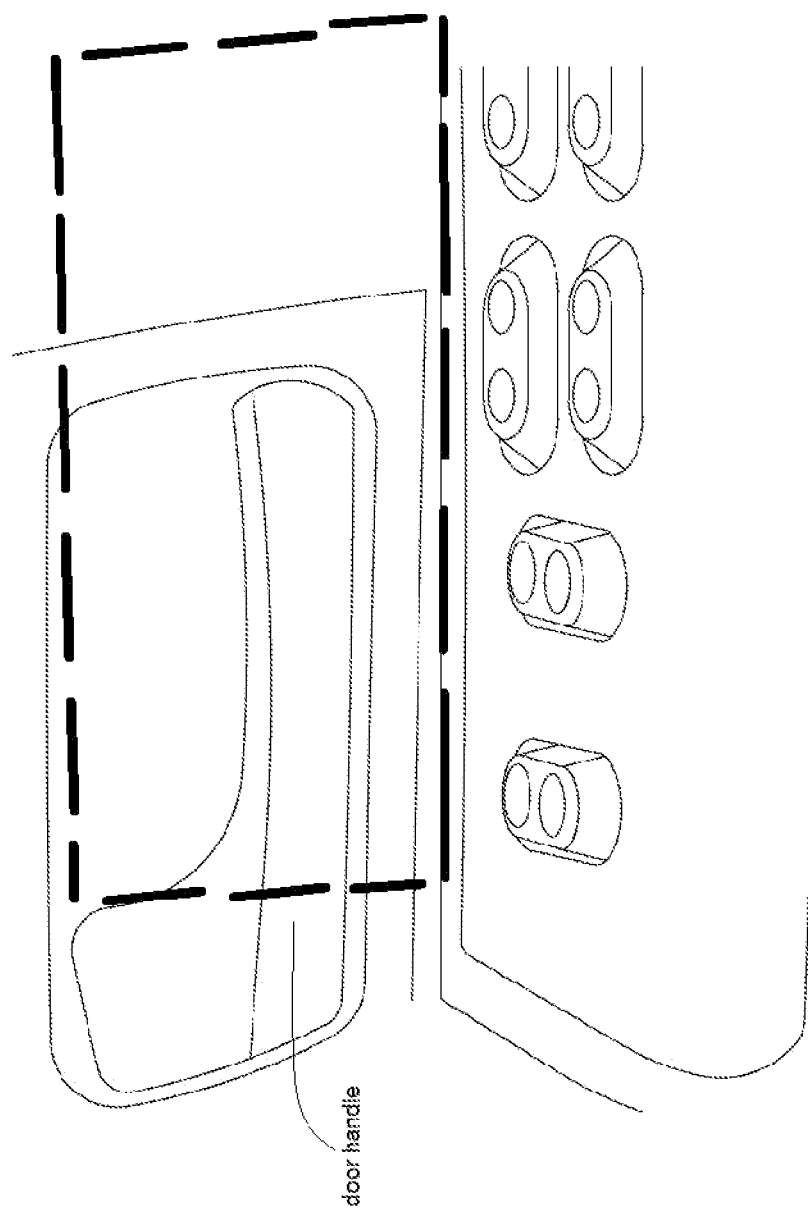
FIG. 9A (conflict)

SAFETY MECHANISM FOR VEHICLE SWITCH PANELS

BACKGROUND OF THE INVENTION

Pet owners routinely take their four-legged family members with them on car trips—short and long. Dogs love to look out the window. For small dogs, this can be dangerous, even deadly. For example, if the dog is left in the car with the engine running (e.g., in order to run the heat or air) and then climbs up on the armrest to look out the side window, they can inadvertently open a window and jump or fall out—or be stolen. The danger intensifies significantly when there is more than one dog in the car, due to the possibility of one dog cycling a window open and closed, which could trap or crush the other dog. Consequently, an improved safety mechanism is desired.

DETAILED DESCRIPTION OF THE DRAWINGS

Figure 5A:
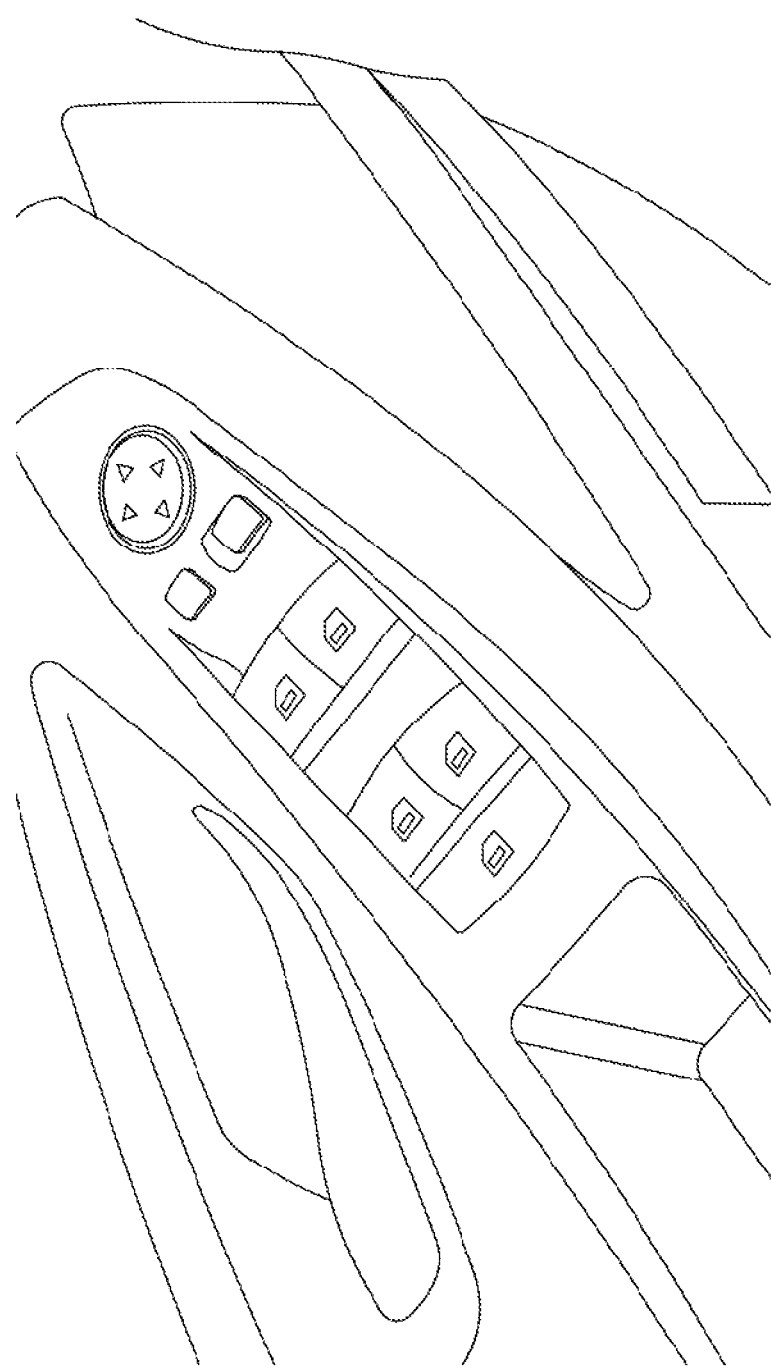
Figure 6A:
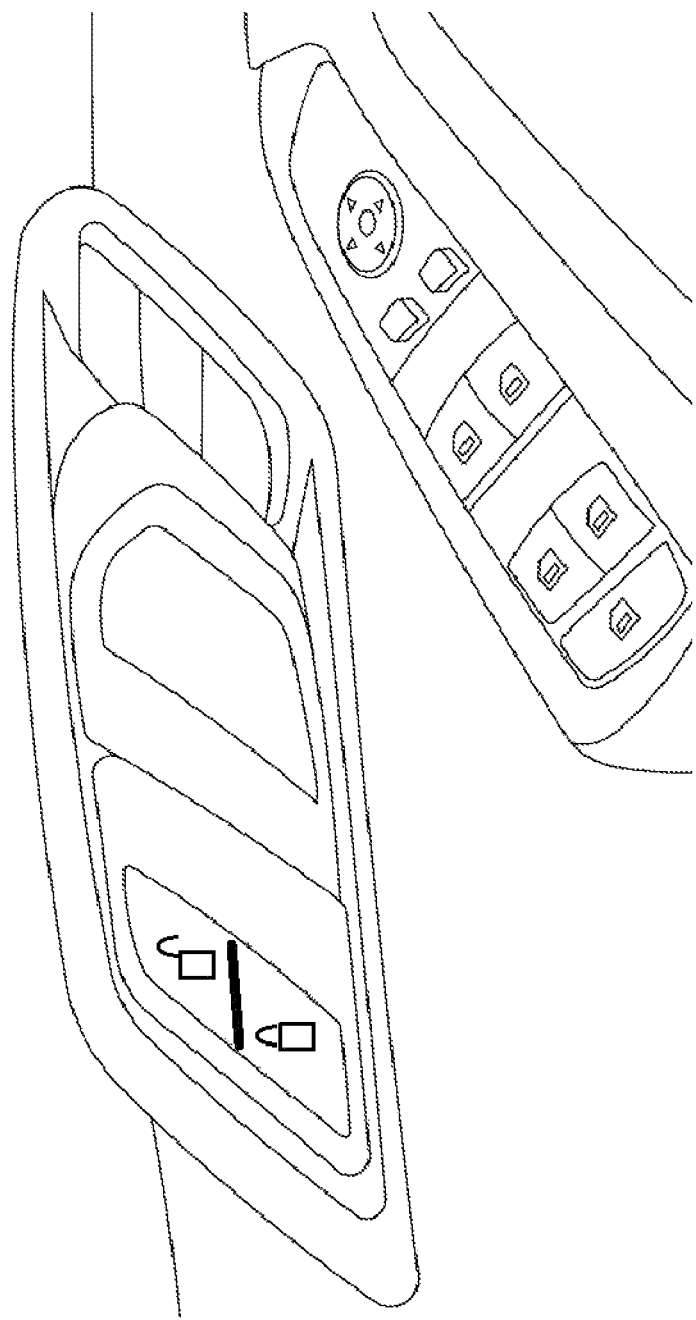
Figure 6B:
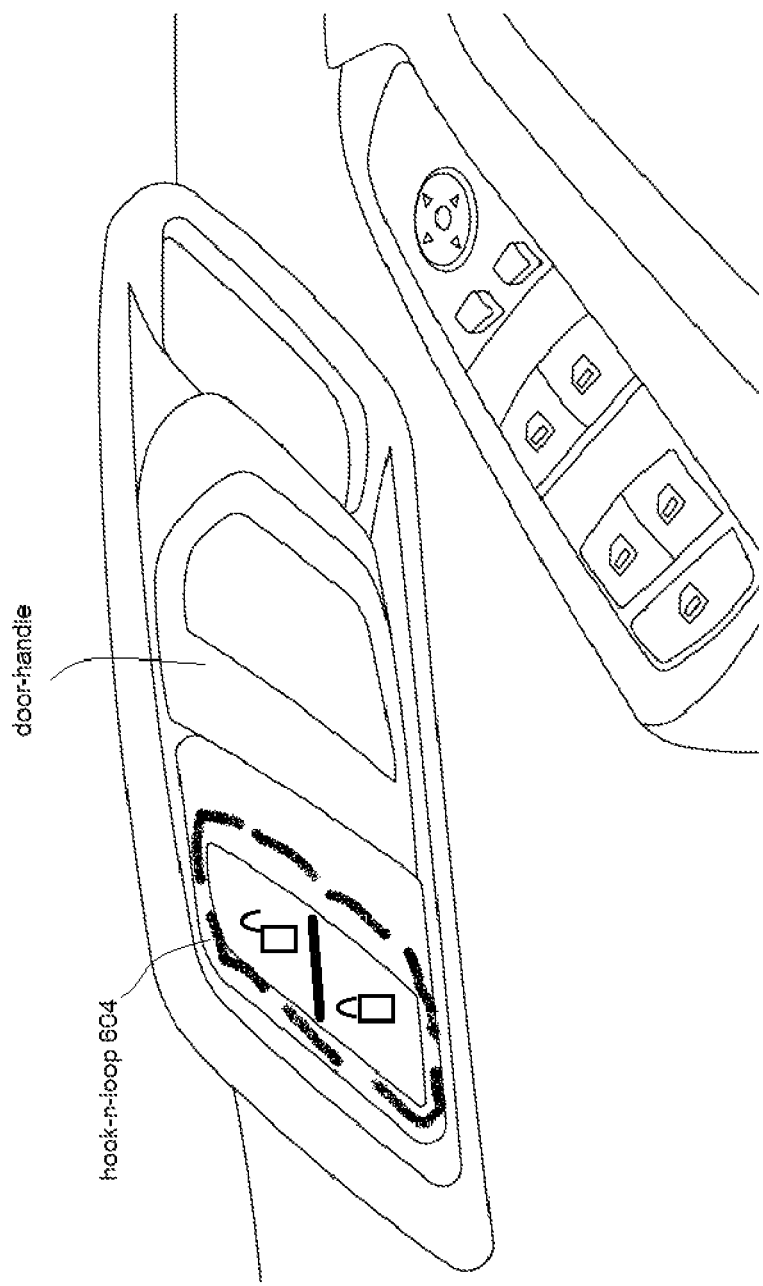
Figure 8A:
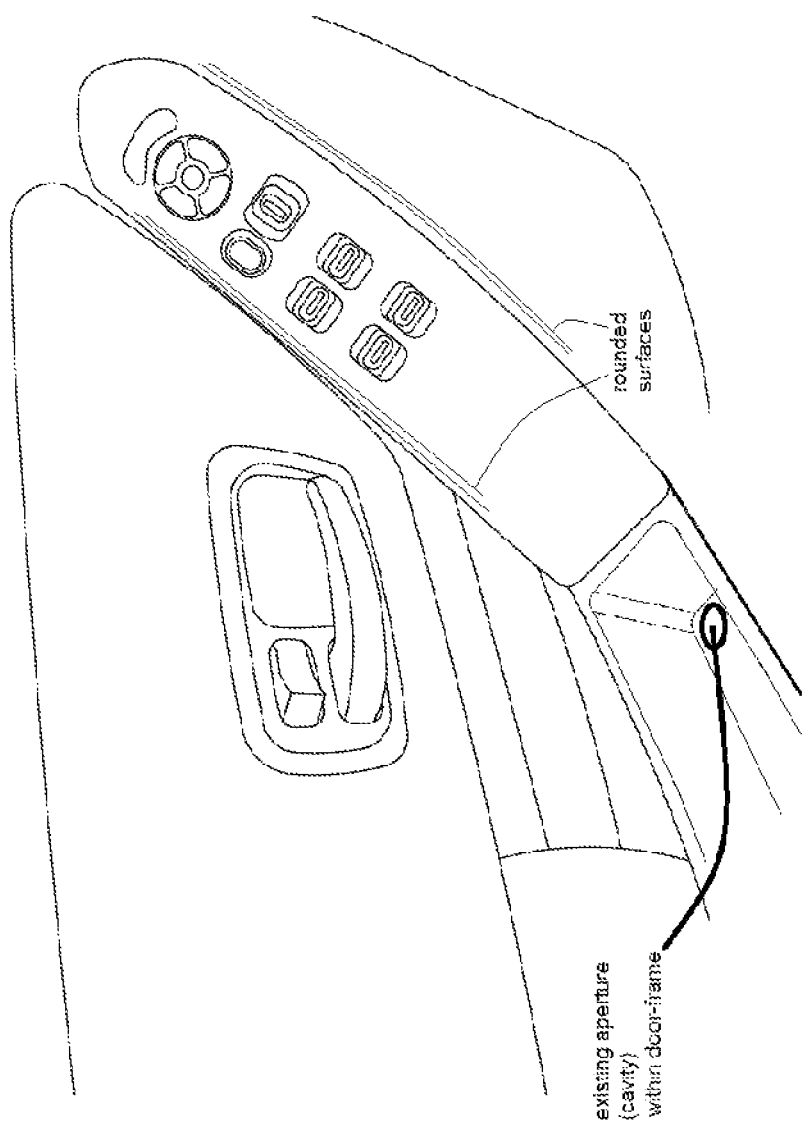
Figure 9B:
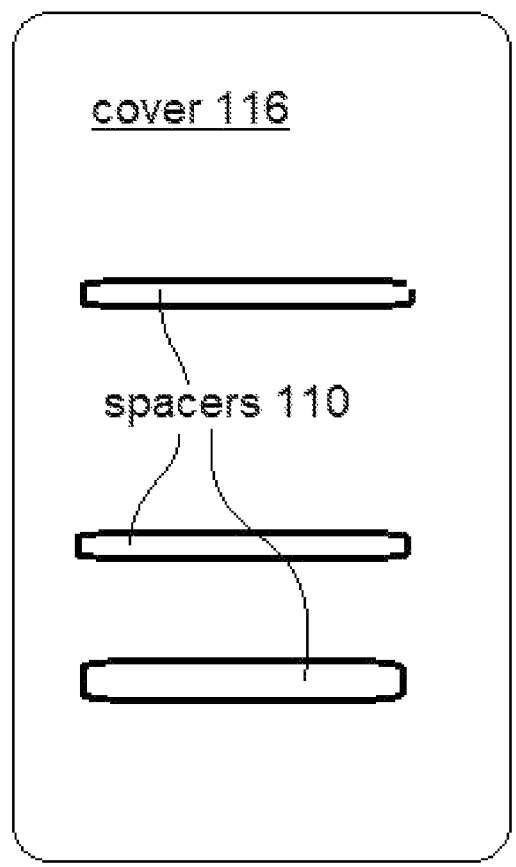
Figure 9C:
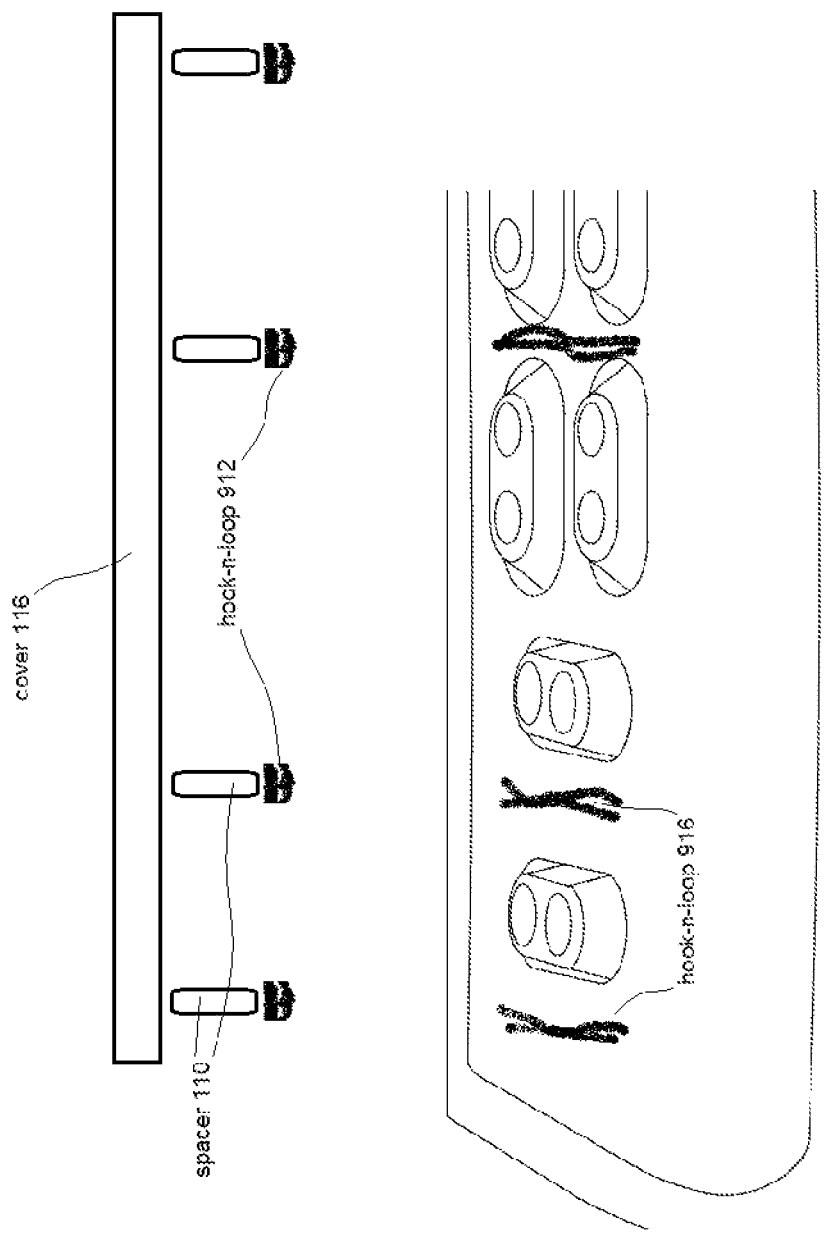

FIGS. 5A, 5B, and 5C show some impediments to using the system;

FIG. 5D shows a non-hinge system that solves the problems within FIGS. 5A, 5B, and 5C;

FIG. 6A (Prior Art) shows some potential styles of button subject to opening by either paws or snout-impact, and FIG. 6B shows a way of overcoming that problem;

FIG. 7 shows a system lacking any bend;

FIG. 8A (Prior Art) shows a door-environment with two rounded surfaces, which makes it difficult to install a hinge;

FIGS. 8B and 8B shows a non-hinge system which does not rotate but instead slides;

FIG. 9A (Prior Art) shows another way that an improperly-located system could impede use of the vehicle-door; and FIGS. 9B and 9C show a system using spacers and not any hinge.

DETAILED DESCRIPTION OF PREFERRED EMBODIMENTS

Figure 1A:
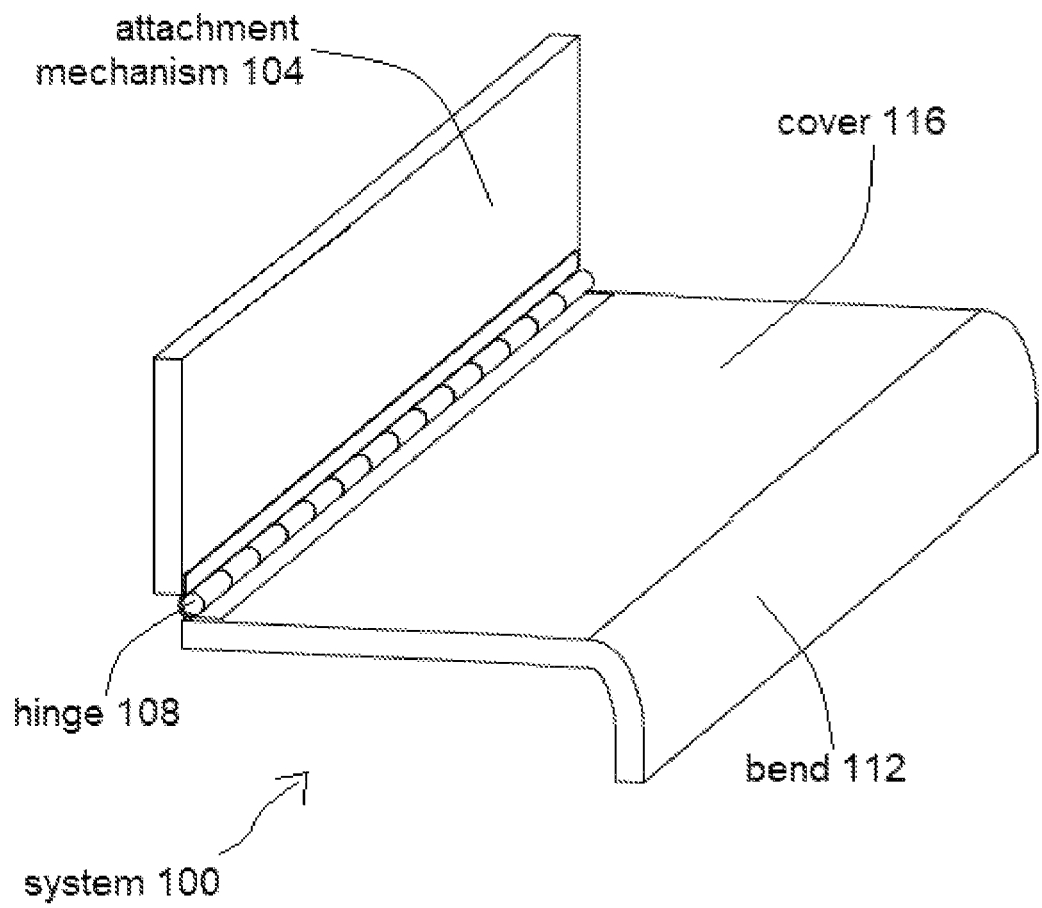
FIGS. 1A and 1B show an example protective system comprising an attachment mechanism, a hinge, either a bend or a plurality of spacers, and a cover.
Figure 1B:
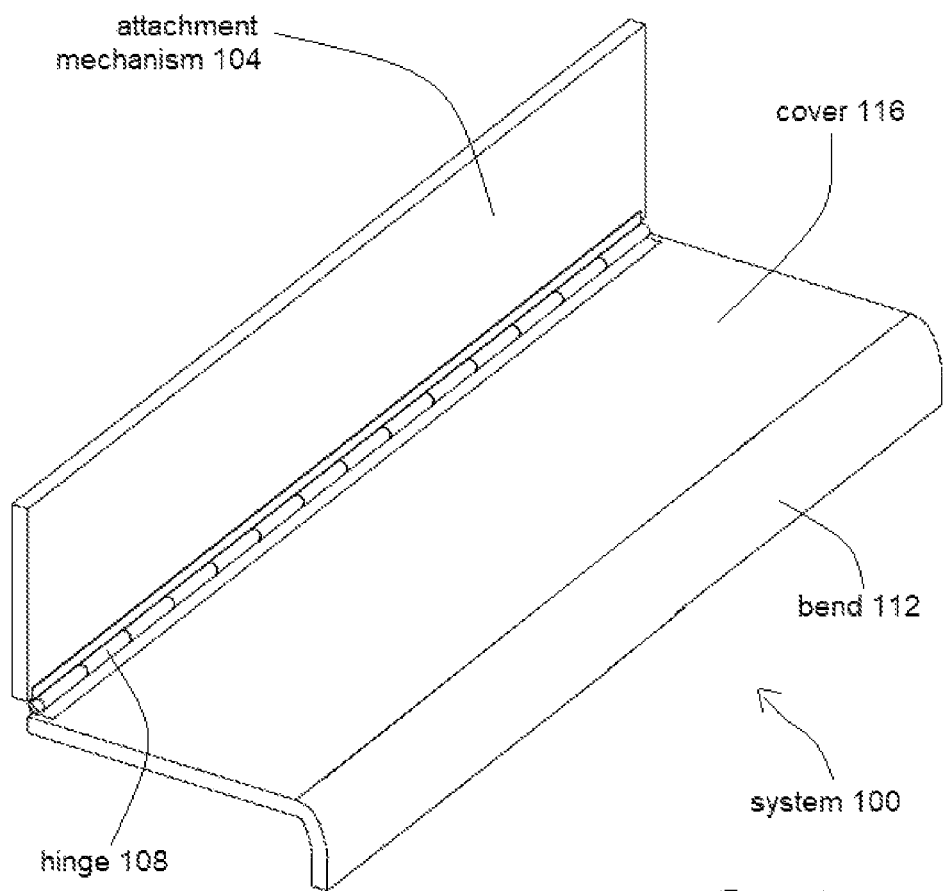

FIGS. 1A and 1B show an example protective system 100 comprising an attachment mechanism 104, a hinge 108, either a bend 110 or a plurality of spacers 112, and a cover 116. The protective system 100 provides suitable covering of window and door locks, and other electrical switches and buttons, typically found within or near to a vehicle's armrest. This in turn prevents accidental actuation of the switches by a pet in the vehicle. The hinge 108 can be acrylic, but may also be other materials.

The protective system 100 also ensures the safety of a pet from falling out of the window or getting their head caught in it when the window goes up, and also prevents a security issue with the vehicle by preventing a pet from locking or unlocking the vehicle when the pet is in the vehicle alone.

Figure 2A:
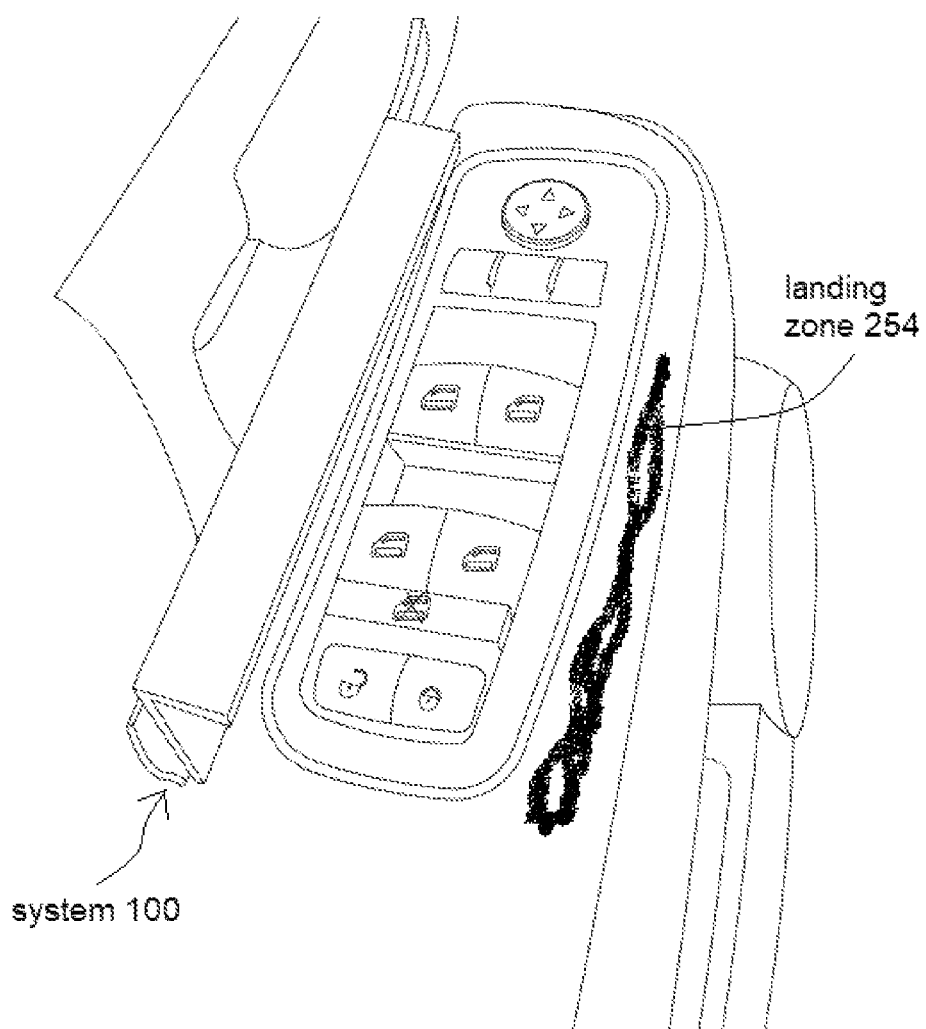
FIGS. 2A and 2B show the system in an installed and in-use context having hook-n-loop as well as show the inter-relationships and spacings in accordance with a vehicle door handle, a vehicle armrest, and a buttons-cluster.
Figures 2B, 2C:
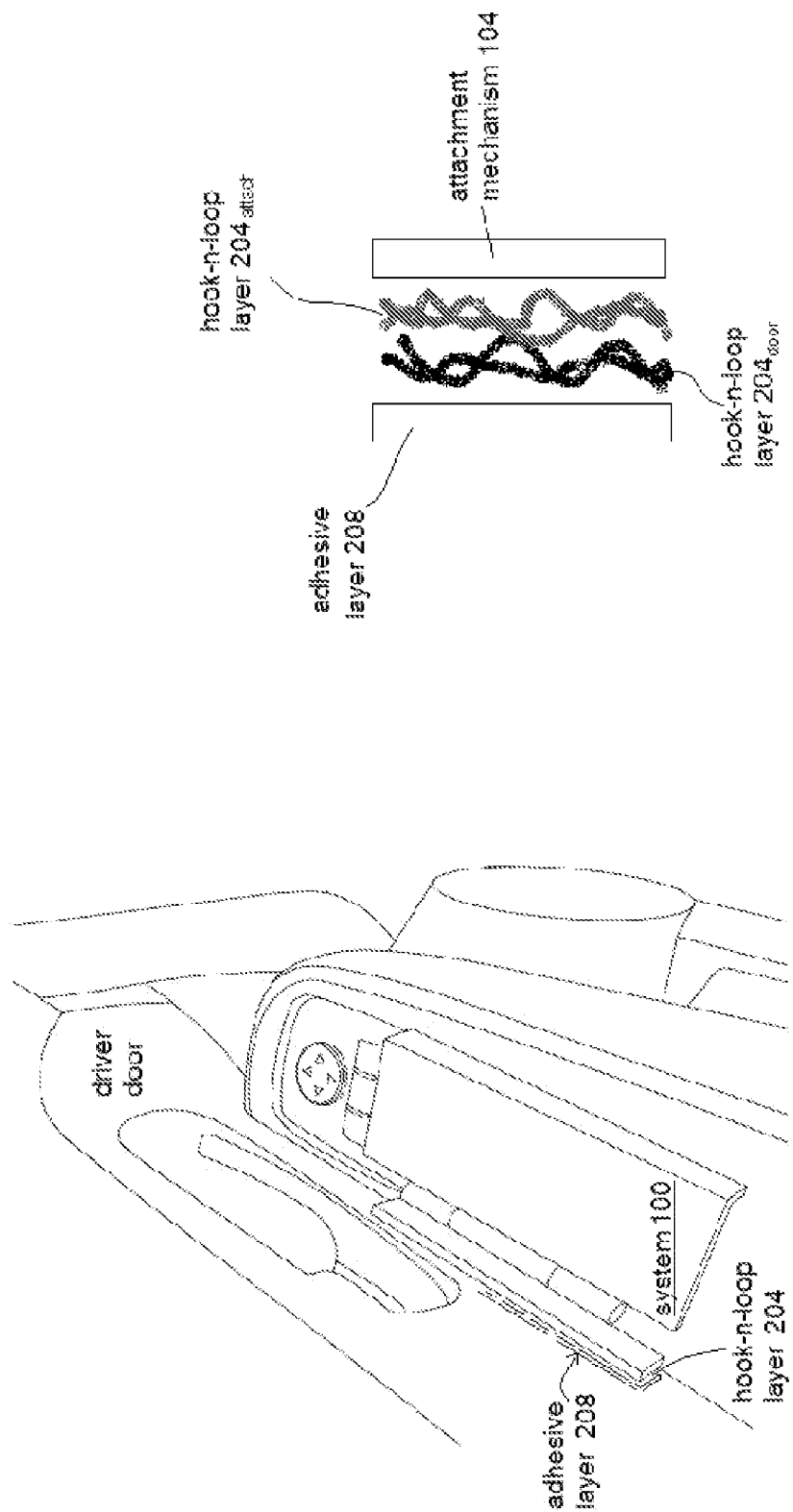
FIG. 2C shows an enlarged version of the hook-n-loop arrives to the purchaser already-paired including the portion which connects to the door and that which connects to the attachment mechanism.

FIGS. 2A and 2B show the system 100 in an installed and in-use context. The hook-n-loop 204 and adhesive backing 208 show how the system 100 is assembled. Although somewhat concealed in FIG. 2B, the hook-n-loop 204 actually comprises hook-n-loop $204_{door}$ (connects to the door) and hook-n-loop $204_{attach}$ (connects to the attachment mechanism 104).

FIGS. 2A-2B show the inter-relationships and spacings of the protective system 100, the vehicle door handle, the vehicle armrest, and the buttons-cluster. Specifically, FIG. 2A illustrates the system 100 in the down (closed) position, where it spends a vast majority of its time, and thus would not and does not interfere with operating the door handle. When a user/driver wants to operate the buttons-cluster, it's easy and instinctive to flip up the cover 116, press whichever desired buttons or switches, and the cover 116 then automatically falls back into position without any problems, manual operation, or other issue that would interfere with or distract a driver's concentration.

In an embodiment, the cover 116 will drop down to remain in-place in a "closed" position so as to not be in the way of or interfere with the door handle. This has the slight disadvantage that the underlying switches are not immediately accessible. However, the embodiments herein should not be considered as being limited exclusively thereto. An embodiment exists in which the cover 116 stays in is up/open position, perhaps flipping down only when the driver leaves the vehicle.

FIG. 2C shows an enlarged version of the hook-n-loop 204 as it arrives to the purchaser already-paired and how it is situated with the portions herein, including the adhesive layer 208 which connects to the door and that which connects to the attachment mechanism 104.

The bend 112 of the cover 116 provides a space or buffer between the switches and the cover 116, and may match with a landing zone 254 (FIG. 2A). This is important because there exists a concern over various add-on-devices within any vehicle, that they may impeded or inhibit access to something important. After all, the panel switches are used while the car is moving e.g. 70-80 MPH, including potentially in heavy traffic. In such conditions, an add-on device must and avoid forcing the driver to take an extra step or make an extra look. Another example could be a person who is about to be the victim of a crime, and needs to lock her doors as quickly as possible. Any impediment to quickly accessing the "lock doors" button could be deadly.

Figure 3:
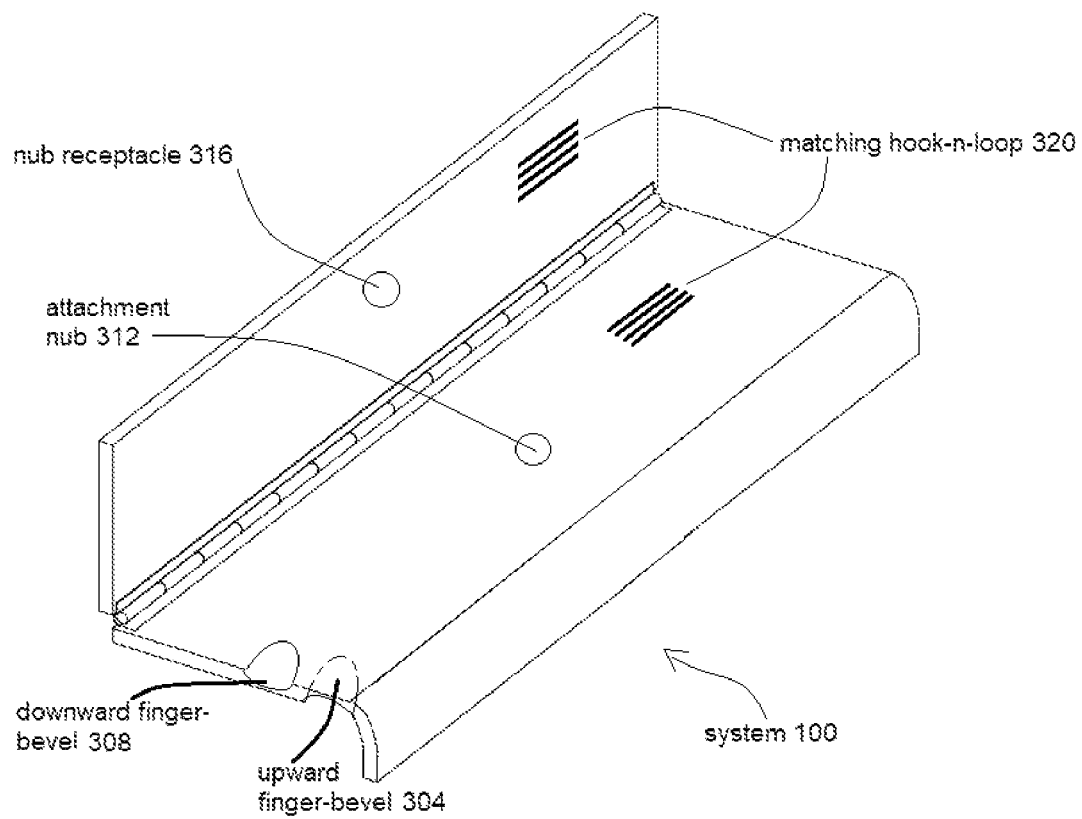
FIG. 3 shows some modified embodiments of the system.

To that end, FIG. 3 shows some embodiments of the system 100 modified to address this issue. Specifically, FIG. 3 show the up-bevel 304 and the down-bevel 308 within the cover 116, for quickly accessing, tactile-sensing, and raising\lowering the cover 116.

Further, an alt-embodiment further comprises a soft-nub 312 for holding the system 100 upwards, by pairing with a nub receptacle 316. Further, the hinge 108 can be tightened or stiffened to require a bit of force to move, and to not just flap loosely or by gravity. This in turn means the system 100 stays wherever the driver leaves it either up or down, preferably up. The hinge may be configured to operate by both a) gravity fall-down and b) non-gravity push-down. Another way to achieve this is the hook-n-loop pairs 320.

As shown in FIGS. 1A-1B, an embodiment of the system 100 has a leaf-type hinge 108 measuring e.g. 2 inches wide and 6 inches long, and the attachment mechanism 104 and cover 116 being made of e.g. ⅛-inch-thick acrylonitrile butadiene styrene (ABS) sheets, cut and heat-treated to a variety of specific predetermined shapes. As will be discussed in more detail herein, the system 100 will have a variety of contours and configurations. However, for clarity and brevity, a focus herein will be on a "one size fits most" embodiment shown in FIGS. 1A-1B and 2A-2B. The cover 116 may also be a different length than the attachment mechanism 104, both longer and shorter.

As shown in FIGS. 2B and 2C, the cover 116 uses hook-n-loop 204 with an adhesive backing 208 to which flex-conforms to fit the shape of the door surface. A lower-cost economy version can use two-sided tape to adhere to the door. An embodiment also includes the same cover 116 at reduced length also, potentially for use in various passenger or rear-seat side buttons.

Window-switches and door-lock-switches are how an animal may escape, and also how the human driver may be locked out. Many drivers do not de-activate rear windows even when that feature is available. The embodiments herein also have a center console protection system $100_{center}$.

Manufacturing

The system 100 requires both manufacturing, and then some user-installation. While embodiments exist in which the system 100 is incorporated into the vehicle at manufacture, e.g. prior to sale of a vehicle, this disclosure will focus more on the user-installable embodiment.

Figure 4:
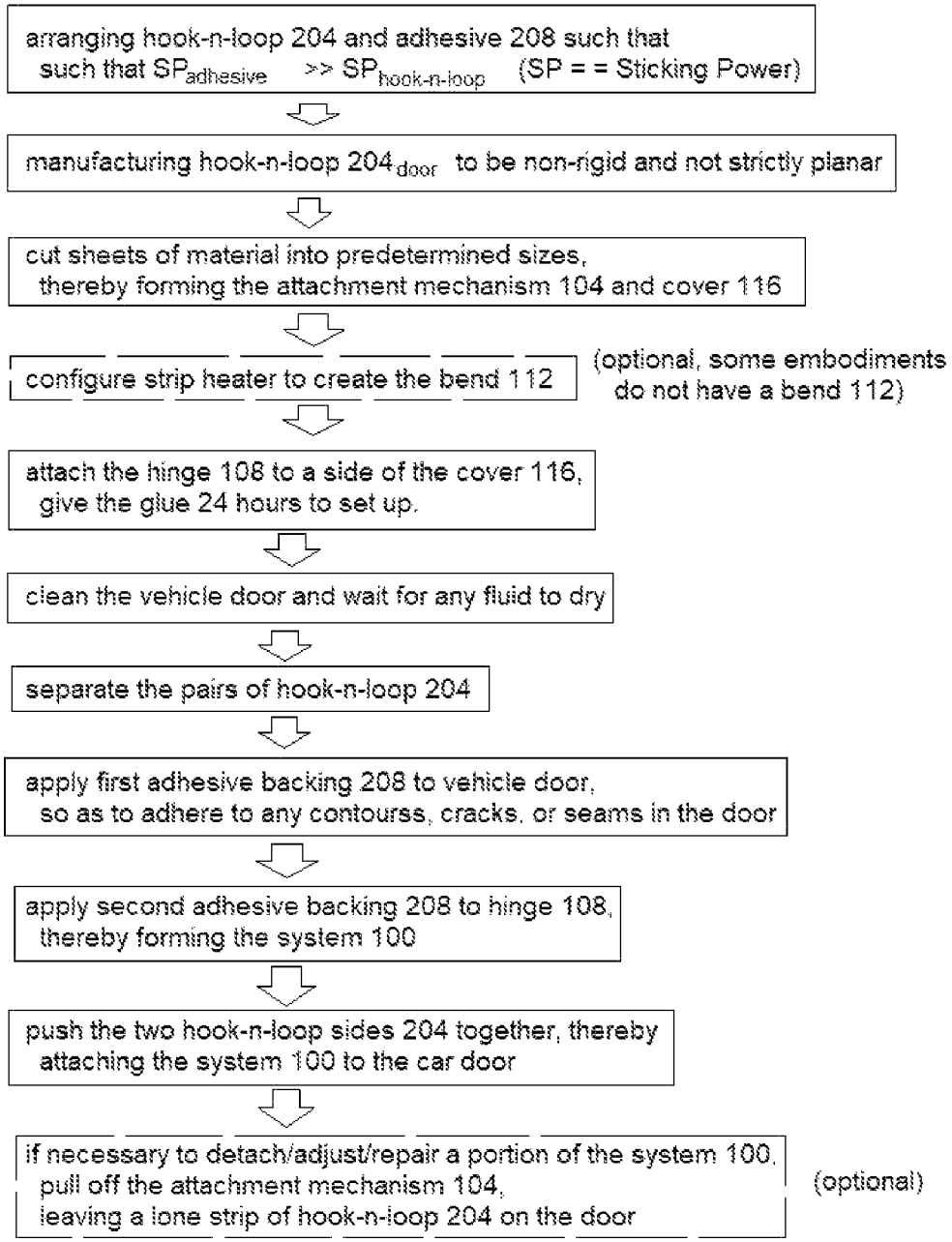
FIG. 4 is a flowchart showing how the system is manufactured.

FIG. 4 is a flowchart showing how the system 100 is manufactured. A first step is to start with sheets of material suitable for forming the system 100, in e.g. ⅛"×48"×96" sizes. Then, cut the attachment mechanism 104 and cover 116 from the sheets using e.g. a table saw into predetermined sizes. The sheets can comprise ABS, but may also be PPA, PETG and PVC. As shown in FIGS. 1A-1B, the wider portion (cover 116) can have the bend 116 located therein and the narrower portion (attachment mechanism 104) will in most embodiments have the hook-n-loop arrangement 204 attached thereto. After the attachment mechanism 104 and cover 116 are separately cut, take them to a strip heater, where at the sheet will become moldable. Specifically, ABS becomes moldable at ~221 degrees Fahrenheit.

It is possible to use the strip or straight line heater to provide shape, contour, and features to either the attachment mechanism 104 or the cover 116. The strip heater has controls with configurable settings to properly heat and bend the material forming the cover 116. One outcome, but not the only outcome, from the strip heater is to form the bend 112 (FIGS. 1A-1B) in those embodiments where the bend 112 is included.

Once the components are heated, it is then possible to start locking in the 90 degree bend, that is, leave the components in the strip heater for a predetermined period of time. Afterwards, remove the components from the strip heater, and wait for the piece to cool. Once cool, then attach the hinge 108 to a side of the cover 116 that is away from the bend 112, potentially using glue. If glue is used, it can be helpful to give the glue 24 hours to set up.

The hook-n-loop 204 arrives to the purchaser already-paired. An enlarged image of this arrangement is shown in FIG. 2C. The hook-n-loop $204_{door}$ will always have a strongly-sticking adhesive backing 208, and will always be the same size as the hook-n-loop $204_{attach}$ which also arrives factory-preinstalled attached to the system 100. Because of such factory-preinstallation, the purchaser-installer merely pulls the two sections of the hook-n-loop 204 apart and install the sticky side of the hook-n-loop $204_{door}$ to the vehicle door. The hook-n-loop $204_{door}$ is manufactured with some flexibility and is non-rigid, and does not need to be strictly planar. Instead, it can be shaped or at least flex-contoured to adhere to any lips, cracks, non-planar contours, or seams the door may have in that area.

In any case, the installer will then push the two hook-n-loop 204 sides together. This technique also provides a bit of a cushion for mounting the system 100.

Within the system 100, at such time as user may wish to detach/adjust/repair a portion of the system 100, that user can pull off the attachment mechanism 104, leaving a lone strip of hook-n-loop 204 on the door surface. As such time, an unwanted outcome would be to remove the attachment mechanism 104, but accidentally pull off both of the hook-n-loop strips 204. Fortunately, hook-n-loop mechanisms vary and are configurable in their semi-adhesive power. Hook-n-loops come in a variety of densities, thicknesses, and configurations depending on how much adhesion (Sticking Power or SP) is desired. Consequently, within the system 100, the combination of adhesive 208 and hook-n-loop 204 are chosen such that $SP_{adhesive} >> SP_{h-n-1}$.

Additionally, initial production runs of the protective system 100 may be limited only to neutral colors such as a dull gray or black. However, as user preferences and sales models become more honed and refined and known, additional colors, features, and styles can be added.

FIG. 5A (Prior Art) shows a common vehicle interior, with some impediments. FIG. 5B shows a first impediment, that any cover 116 rotating on a hinge, will likely interfere with or clash with the door-handle. FIG. 5C shows a second impediment, the vehicle interior has contours and is non-flat and would not be suitable for mounting a system 100. To overcome these impediments, FIG. 5D shows a potential usage of a non-hinge system, in which a custom hook-n-loop 504 is located in an e.g. rectangular pattern around the switch panel. In this embodiment, a cover might be attached directly, and not have a hinge at all. That cover might also be flexible and non-planar. During times of non-use, such a cover could be stored elsewhere, and retrieved only during times where the driver must exit the vehicle with the pets inside.

FIG. 6A (Prior Art) shows some potential styles of button subject to opening by either paws, or even snout-impact. As shown in FIG. 6A, the "lock" and "unlock" buttons are a bit larger than window buttons, mounted vertically, and thus easily accessible to a pet, either by paw or by snout. These buttons would require a separate type of system other than the system 100 shown in FIGS. 1A and 2A. To address this, a border 604 of hook-n-loop material could be arranged, separate from a potential system 100 also in-use. Like with the embodiment of FIG. 5D, such a cover might be attached directly, and not have a hinge at all. That cover might also be flexible and non-planar.

There exist numerous styles of button-layout within an armrest, including a type of ridge or border around the buttons. To address this, FIG. 7 shows a system 700 lacking any bend 112. Instead, the system 700 rests atop the pre-existing ridge or border 704. Because the border 704 stands above the buttons and switches, no bend 112 is needed, a flat cover 716 can prevent contact with the buttons and switches.

FIG. 8A (Prior Art) shows a door-environment with various rounded surfaces, which makes it difficult to install any hinge of any kind, but also where the door-handle forms a type of aperture or cavity within the body of the door. A hinge might install, but is unlikely to stick well or to stay in place very long. To address this, FIG. 8B shows a non-hinge system 800 which does not rotate, but instead slides in exactly and only two linear directions, perhaps sliding into a pre-existing cavity within the door-design. FIG. 8B shows the system 800 in a closed, in-use position. FIG. 8C shows the system 800 in an open, non-use position, taking advantage of the unused space within the aperture or cavity.

FIG. 9A (Prior Art) shows another way that an improperly-located cover could impede use of the vehicle-door. FIGS. 9B and 9C show ways of addressing this impediment, with a modified cover 116. As shown in FIGS. 9B and 9C, spacers 110 can perform a multi-service. First, the spacers 110 attach the cover 116 to the switch panel, but do so in a way that does not impede access to the door-handle. Second, the spacers 110 provide a sort of stand-off or gap between the cover 116 and the switch-panel.

Potential Variations of Embodiments

The specific configuration of window control panels (aka button clusters or switch clusters) varies widely from one vehicle to another, whether automobile, truck, or other style of vehicle. Thus, in an embodiment, it is possible to user a pre-scored cover 116 that allows a consumer to "crack" the cover 116 at the appropriate length and width of the switch panel within their vehicle. Each panel segment could then be trimmed with a pair of scissors or a utility knife.

In the crack-off model, where the user self-selects their own size according to their own switch-panels, and "breaks off", there are numerous techniques to create the specific cracks. The non-crack-off embodiment can be cut with scissors. Alternately, break-off points in the cover 116 can be defined after cutting to size by scoring with a sharp blade or router head, depending on thickness of the material of the cover 116. This method would be best suited for small-scale production as it requires no tooling.

In many vehicles, when a user engages a master window lock on a driver's side, all other windows are locked. However, not all vehicles offer this feature. Further many drivers do not use this feature. That's why some drivers may still pursue protective systems 100 on rear or passenger doors of the vehicle.

It is also contemplated to include a center-console embodiments of the system 100 for whichever dangerous buttons are located therein. An animal walking on these could do some kind of harm, including the animal exiting the vehicle and not coming back. Most vehicles' danger areas will be the driver's armrest switch panel. However, some vehicles have important buttons e.g. lock/unlock on the center console also, as well as emergency-flashers, emergency-brake, and trunk-open buttons. There even exists vehicles in which the P, R, N, and D are changed by buttons in the center console. To address situations like this, a center-console embodiment may be retractable or foldable.

As customers awareness increases, more and more potential customers will indicate willingness to pay premiums for specialized versions of the system 100 and also embodiments that an end-purchaser can customize. It is a strong imperative of the embodiments herein that the cover 116 not lay flat directly on the buttons but instead provide some spacing or buffer between the cover 116 and the switch panel. This is because a dog-paw could still step on and activate buttons, albeit in a diffused context.

Business Model

An initial business model will be that the protective system 100 is sold as an "add-on" product, which is attached to existing vehicles. However, it is also anticipated that the protective system will be manufactured directly into door panels, switch panels, and door handles, and thus sold as part of the vehicle. In this embodiment, it is possible that a user or driver would push a "pet security button" on the dashboard or fob and an embodiment of protective system 100 cover slides out over the buttons or a button-cluster from a built in port within a car door. Such an embodiment of the protective system 100 may be an example of a "low-profile" version, which is flat and easily slides and in out from a pre-designed aperture with only minimal resistance.

Selling the protective system 100 as an "add-on" product that is attached to existing vehicles could be done directly in the showroom. A sales-person could see that the potential-purchaser has a pet, or ask the person. Such a selling point could help push a wavering purchaser "over the top" to buying the vehicle.

The add-on version of the system 100 will be sold in a variety of e-commerce modalities. This can include Amazon, self-site, storefront sites, and potentially other e-commerce mechanisms.

Disclaimer

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A method of manufacturing a protective system comprising an attachment mechanism, a hinge, and a cover having a bend, the method comprising:
   starting with rectangular sheets of foundation material having a predetermined size suitable for forming the system;
   cutting the attachment mechanism and cover into predetermined sizes from the sheets using a table saw;
   manufacturing the attachment mechanism to have a rectangle shape;
   locating a hook and loop arrangement on one side of the attachment mechanism;
   configuring the cover to have the bend by heating the cover within a strip heater to a temperature at which the sheet becomes moldable;
   locking in the bend by leaving the cover in the strip heater for a predetermined period of time, removing the cover, and waiting for the cover to cool;
   attaching a first side of the hinge to a surf ace of the cover that is away from the bend; and
   attaching a second side of the hinge to the attachment mechanism.

2. The method of claim 1, further comprising:
   manufacturing the cover and the attachment mechanism of the same material and having a same depth.

3. The method of claim 2, further comprising:
configuring the hook and loop arrangement to have a door-portion and an attach-portion.

4. The method of claim 3, further comprising:
configuring the hook and loop arrangement to arrive to a purchaser already-paired.

5. The method of claim 4, further comprising:
manufacturing the hook and loop with a predetermined one of a plurality of densities, thicknesses, and configurations depending on how much adhesion (Sticking Power or SP) is needed for a particular door-surface;
selecting a combination of adhesive and hook and loop such that $SP_{adhesive} > SP_{h\text{-}n\text{-}1}$, wherein $SP_{adhesive}$ is a sticking power of the adhesive, and $SP_{h\text{-}n\text{-}1}$ is a sticking power of the hook and loop.

6. The method of claim 3, further comprising:
the door-portion having an adhesive backing in the same size as the attach-portion; and
the hook and loop arriving to an end-user factory-preinstalled attached to the attachment mechanism using adhesive.

7. The method of claim 6, further comprising:
manufacturing the door-portion to be flexible, non-rigid, and non-planar.

8. The method of claim 7, further comprising:
manufacturing the door-portion with a segment of cushion for mounting the system on non-uniform surfaces of a vehicle.

9. The method of claim 8, further comprising:
configuring the attachment mechanism with an adhesive backing which flex-conforms to fit the shape of a door surface.

10. The method of claim 7, further comprising:
configuring the bend to achieve a space or buffer between a vehicle switch panel and the cover.

11. The method of claim 7, further comprising:
configuring the cover with an up-bevel and a down-bevel.

12. The method of claim 6, further comprising:
the hinge being acrylic.

13. The method of claim 12, further comprising:
securing the cover to the hinge using glue; and
giving the glue a predetermined period of time to set up.

14. The method of claim 13, further comprising:
configuring the hinge to be tightenable enough such that it does not move by gravitational force alone.

15. The method of claim 14, further comprising:
configuring the cover and hinge to operate by gravity fall-down.

16. The method of claim 14, further comprising:
configuring the cover and hinge to operate by non-gravity push-down.

17. The method of claim 6, further comprising:
configuring the cover to be a different length than the attachment mechanism.

18. The method of claim 6, further comprising:
manufacturing the system to be adaptable for rear or passenger doors of a vehicle.

19. The method of claim 2, further comprising:
cutting the cover to be wider than the attachment mechanism.

20. The method of claim 2, further comprising:
the sheets comprising ABS.

* * * * *